United States Patent [19]
Hirschfeld

[11] Patent Number: 5,582,110
[45] Date of Patent: Dec. 10, 1996

[54] WHEELED VEHICLE CONSTRUCTION FOR INCREASED SPEED

[76] Inventor: Abraham J. Hirschfeld, 15 Penn Plaza, 415 Seventh Ave., #150, New York, N.Y. 10001

[21] Appl. No.: 533,378

[22] Filed: Sep. 25, 1995

[51] Int. Cl.$^6$ ............................ B61F 3/00; B60B 17/02
[52] U.S. Cl. ................ 105/199.2; 105/168; 105/199.1; 295/11; 295/30.1
[58] Field of Search .................... 105/167, 168, 105/199.1, 199.2; 295/7, 11, 12, 30.1, 31.1; 280/112.2

[56] References Cited

U.S. PATENT DOCUMENTS

| | | | |
|---|---|---|---|
| 373,213 | 11/1887 | Woodbury | 295/11 |
| 443,047 | 12/1890 | Haugh et al. | 295/11 |
| 1,945,283 | 1/1934 | Loomis . | |
| 1,948,060 | 2/1934 | Bourdon . | |
| 1,963,932 | 6/1934 | Bollinger . | |
| 1,977,387 | 10/1934 | Howald . | |
| 1,999,937 | 4/1935 | Ledwinka | 295/30.1 |
| 2,000,000 | 4/1935 | Ledwinka | 295/30.1 |
| 2,009,349 | 7/1935 | Tarbox . | |
| 2,027,739 | 1/1936 | Ledwinka | 295/30.1 X |
| 3,795,203 | 3/1974 | Sundby | 105/199.1 X |
| 3,902,691 | 9/1975 | Ott | 105/199.2 X |
| 3,911,830 | 10/1975 | Adams | 105/199.2 X |
| 3,913,495 | 10/1975 | Pelabon | 105/199.2 X |
| 4,982,671 | 1/1991 | Chollet et al. | 105/168 |

FOREIGN PATENT DOCUMENTS 5330302  12/1993  Japan ..................... 295/31.1

*Primary Examiner*—Robert J. Oberleitner
*Assistant Examiner*—Kevin D. Rutherford
*Attorney, Agent, or Firm*—Ladas & Parry

[57] ABSTRACT

A vehicle movable along a pair of tracks includes a drive for pivoting the vehicle body with respect to the front and rear wheel assemblies about a pivotal axis parallel to the longitudinal axis of the vehicle body. The wheels include track-engaging surfaces formed with peripheral flanges on the opposite sides extending radially outwardly of the wheel for engaging the sides of the respective tracks. The wheels of each wheel assembly are of metal but all their track-engaging surfaces are covered by resilient material.

10 Claims, 5 Drawing Sheets

WHEELED VEHICLE CONSTRUCTION FOR INCREASED SPEED

FIELD AND BACKGROUND OF THE INVENTION

The present invention relates to wheeled vehicles constructed for increased speed, and particularly to railroad-type vehicles movable along a pair of tracks.

Railroad tracks are conventionally banked at curves to prevent side slipping at high speed. Thus, the rail on the outer side of the curve is laid at a greater elevation than that on the inner side of the curve such that the resultant of the weight of the vehicle, and the centrifugal force produced by the movement of the vehicle around the curve at high speed, falls substantially perpendicularly to the plane through the upper surfaces of the two tracks, thereby preventing side slipping.

OBJECTS AND BRIEF SUMMARY OF THE INVENTION

An object of the present invention is to provide a vehicle constructed so that it may be individually controlled to enable the vehicle to traverse curves at increased speed.

According to one aspect of the present invention, there is provided a vehicle movable along a pair of tracks, comprising: a vehicle body having a front end, a rear end, and a longitudinal axis extending lengthwise of the vehicle body; a front wheel assembly including a pair of front track-engaging wheels mounted on opposite sides of the longitudinal axis at the front end of the vehicle body; and a rear wheel assembly including a pair of rear track-engaging wheels mounted on opposite sides of the longitudinal axis at the rear end of the vehicle body. The vehicle body is pivotally mounted to the wheel assemblies about a pivotal axis parallel to the longitudinal axis of the vehicle body. The vehicle further includes a drive for pivoting the vehicle body with respect to the front and rear wheel assemblies about the pivotal axis parallel to the longitudinal axis of the vehicle body. The wheels of each wheel assembly are of metal and include a track-engaging surface formed with a peripheral flange on one side of one wheel of the pair, and on the opposite side of the other wheel of the pair, which flanges extend radially outwardly of the wheels for engaging the respective sides of the tracks. The outer surface of each wheel, including its peripheral flange, is carried by a resilient member engageable with the respective track.

A vehicle constructed in accordance with the foregoing features may thus be controlled to traverse the curves at higher speed, much like a cyclist instinctively leans inwardly when traversing a curve. Thus, the weight of the cyclist, and the centrifugal force applied to the cyclist when traversing the curve, both act in one direction and are balanced in the opposite direction by the vertical reaction force of the ground, and the horizontal frictional force applied by the ground to the wheels of the bicycle. The higher the speed, and the smaller the radius of the curve, the greater will be the centrifugal force; therefore the greater will be the angle the cyclist will have to lean inwardly, and the greater will be the horizontal frictional force applied by the ground, in order to balance these forces. If the centrifugal force is too great, the horizontal frictional force may not be sufficient to prevent side slipping.

The present invention provides a vehicle which may be controlled in the same manner as a cyclist controls a bicycle when traversing a curve, and in addition it provides peripheral flanges on the sides of the wheels to prevent side slip when traversing the curve, thereby enabling the vehicle to traverse the curve at a higher speed. The peripheral flange and its resilient covering engageable with the track reduces vibration as the vehicle traverses curves at the higher speeds. The invention can be applied both to banked tracks and to unbanked tracks, since the increased speed permitted by the foregoing features of the invention is in addition to the increased speed permitted by banking the tracks.

According to a further feature in the described preferred embodiment, the wheel assemblies may also include a further drive for pivoting them about a vertical axis perpendicular to the longitudinal axis of the vehicle body.

Further features and advantages of the invention will be apparent from the description below.

BRIEF DESCRIPTION OF THE DRAWINGS

The invention is herein described, by way of example only, with reference to the accompanying drawings, wherein.

THE DIAGRAMS OF FIGS. 1–3

Figure 1:
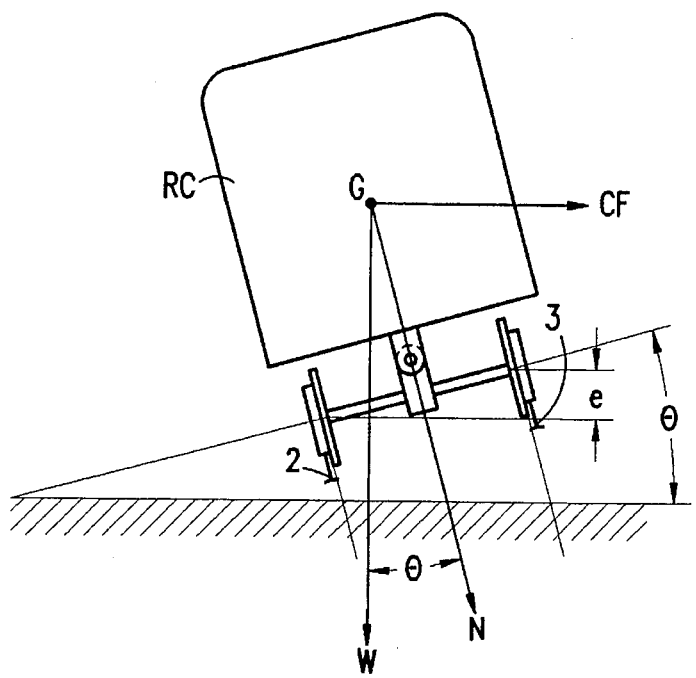
FIG. 1 diagrammatically illustrates the forces involved when a vehicle travels around the curve of a pair of railroad tracks which are banked in order to permit vehicles to safely traverse the curve at higher speeds.

FIG. 1 illustrates the forces involved when banking a pair of railroad tracks 2, 3 along a curve in order to permit the railroad car RC to traverse the curve at higher speeds without side slip. Thus, track 3 on the outer side of the curve is at a higher elevation, by the distance "e", than track 2 on the inner side of the curve, such that at a predetermined velocity, the resultant of the vertical force W (corresponding to the weight of the vehicle) and the horizontal force CF (corresponding to the centrifugal force produced as the vehicle executes the curve) falls substantially perpendicularly to the plane defined by the top surfaces of the two rails 2, 3. The banking angle "θ" is thus the angle between the resultant force N and the weight W, and increases with an increase in the vehicle velocity for which the curve is designed.

Where the tracks are not banked, or insufficiently banked for the respective vehicle velocity, the resultant force N is not perpendicular to the plane of the upper surfaces of the two tracks, and therefore a side force is produced parallel to this plane.

Figure 2:
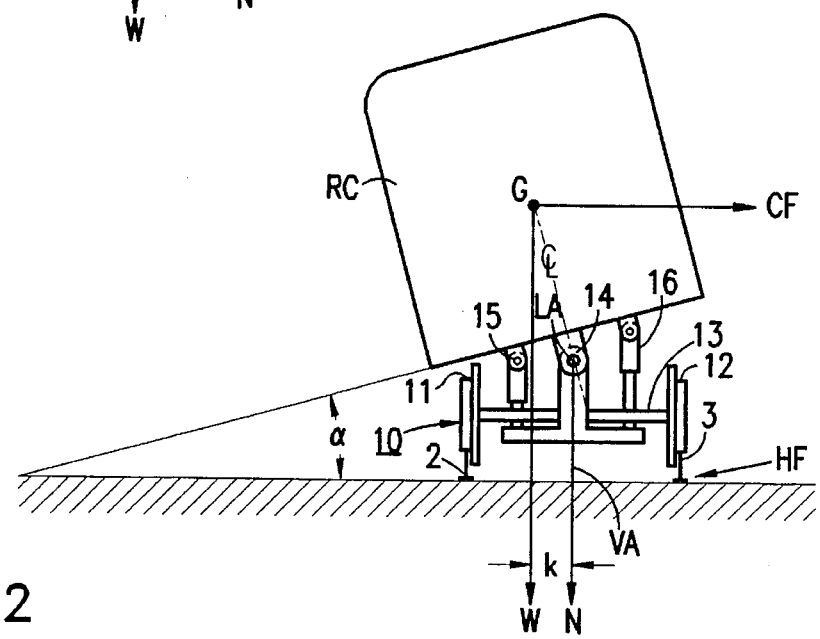
FIG. 2 diagrammatically illustrates the forces involved when a vehicle is constructed in accordance with the present invention to enable the vehicle to safely traverse curves at higher speeds.

FIG. 2 illustrates the forces involved with respect to a vehicle, particularly a railroad car RC, constructed in accordance with the present invention. For purposes of simplifying the description, the railroad tracks 2 and 3 are not banked as in FIG. 1, but it will be appreciated that they could also be banked.

FIG. 2 illustrates only one wheel assembly 10, e.g., the one mounted to the rear end of the railroad car RC. This assembly includes two wheels 11, 12 connected together by a transverse axle 13 extending perpendicularly to the longitudinal axis LA of the railroad car. The railroad car is pivotally mounted along its longitudinal axis LA by a swivel pin 14 extending in the longitudinal direction. The railroad car RC may be pivoted in one or the other directions about swivel pin 14 by controlling a pair of drive units, in the form of cylinder-piston assemblies 15, 16, coupled between the railroad car and the axle 13 of the wheel assembly on opposite sides of the longitudinal axis LA.

The railroad car RC shown in FIG. 2 may be controlled in the same manner as a cyclist controls himself or herself when traversing a curve. Thus, just as the cyclist instinctively leans inwardly, the two drive units 15, 16, would be controlled to pivot the railroad car RC about the longitudinal axis LA in order to balance the moments produced on the one hand by the weight W and centrifugal force CF, and on the other hand by the resultant of the vertical reaction of the ground N and the horizontal force HF applied by the tracks 2, 3, with respect to the vehicle wheels 11, 12.

The angle $\alpha$ of pivoting the railroad car RC increases with the increase in the velocity in order to maintain this balance of forces. However, an increase in the angle $\alpha$ also increases the horizontal force HF applied by the tracks 2, 3, against the wheels 11, 12 of the railroad car.

According to an important feature of the present invention as will be described below more particularly with reference to FIGS. 9–12, the wheels 11, 12 of the railroad car are specially constructed so as to better resist this horizontal force HF, and thereby to permit the railroad car to traverse curves at higher speeds.

Figure 3:
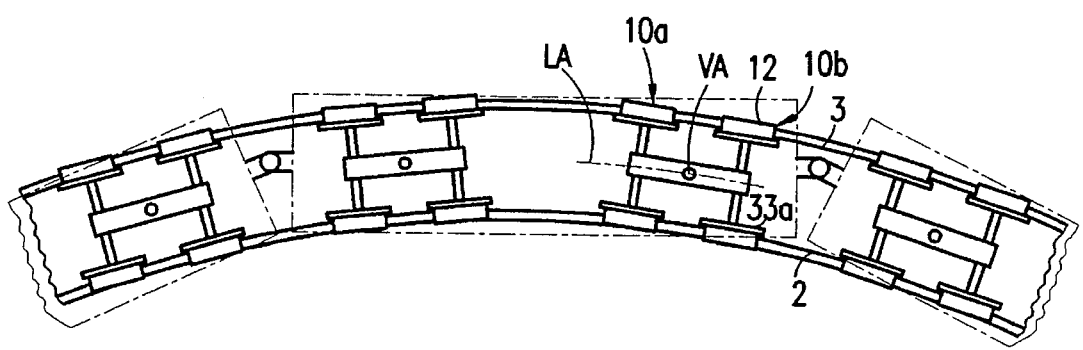
FIG. 3 is a top plan view illustrating the manner in which a vehicle constructed in accordance with another feature of the present invention may safely traverse relatively sharp curves in railroad tracks.
Figure 4:
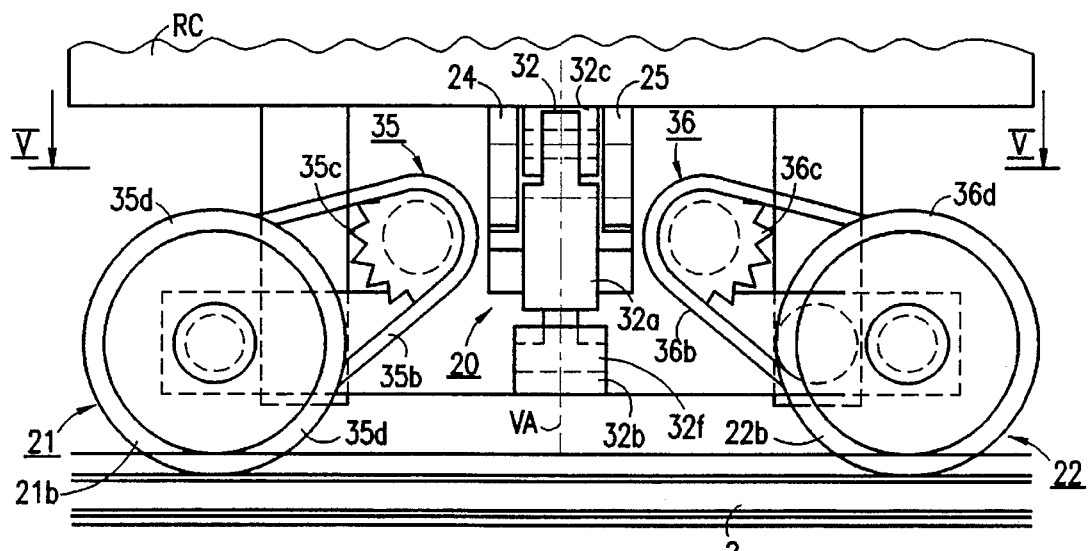
FIG. 4 diagrammatically illustrates, in side elevation, one form of vehicle constructed in accordance with the present invention.

FIG. 3 schematically illustrates a further feature of the invention, in that the front wheel assembly 10a and rear wheel assembly 10b are also pivotally mounted about a vertical axis VA perpendicular to the longitudinal axis LA of the vehicle body. The vehicle is provided with another drive (described below) for pivoting the wheel assemblies about vertical axis VA. Such an arrangement permits the railroad car RC to traverse relatively sharp curves in the tracks 2, 3.

DESCRIPTION OF PREFERRED EMBODIMENTS

FIGS. 4–7 illustrate one construction of a vehicle to permit it to operate as shown in FIGS. 2 and 3. The vehicle is a railroad car RC provided with a wheel undercarriage 20 mounting a front wheel assembly 21 at the front end of the railroad car, and a rear wheel assembly 22 at the rear end of the railroad car. The front wheel assembly 21 includes a pair of wheels 21a, 21b coupled together by a transverse axle 21c; similarly, the rear wheel assembly 22 includes a pair of wheels 22a, 22b coupled together by a transverse axis 22c.

The wheel undercarriage 20 is mounted to the bottom of the railroad car RC by mounting plate 23 carried by the undercarriage and fixed between a pair of spaced brackets 24, 25 depending from the bottom wall of the railroad car. The upper end of plate 23 is formed with a bore for receiving a horizontal swivel pin 26 extending longitudinally of the railroad car parallel to the longitudinal axis LA of the railroad car. The lower end of plate 23 is of reduced diameter to define a vertically-extending pin 27 for pivotally mounting the undercarriage unit 20 about the vertical axis VA perpendicular to the longitudinal axis LA.

It will thus be seen that the horizontal swivel pin 26 provides a first pivotal mounting between the undercarriage 20 and the railroad car RC permitting the railroad car to be pivoted about the longitudinal axis LA of the railroad car; and that vertical pin 27 provides a second pivotal mounting between the railroad car and the undercarriage permitting the railroad car to be pivoted about the vertical axis VA centrally of the railroad car and perpendicular to its longitudinal axis LA.

The railroad car RC is pivoted about the horizontal swivel pin 26 by two drive units 31, 32 (corresponding to drive units 11, 12, FIG. 2) on the opposite sides of the longitudinal axis defined by the horizontal swivel pin. Drive unit 31 includes a cylinder 31a pivotally coupled by a pin 31b, carried by brackets 31c, to the bottom wall of the railroad car, and a piston 31d having a rod 31e pivotally coupled by pin 31f to the undercarriage 20 on one side of the horizontal swivel pin 26. Drive unit 32 includes comparable elements 32a–32f coupled between the bottom wall of the railroad car and the undercarriage 20 on the opposite side of the horizontal swivel pin 26. Thus, by retracting piston 31d within its cylinder 31a, and extending piston 32d within its cylinder 32a, the railroad car is pivoted (counter-clockwise in FIG. 6, as in FIG. 2) with respect to the undercarriage wheel unit 20 around the horizontal swivel pin 26.

Figure 5:
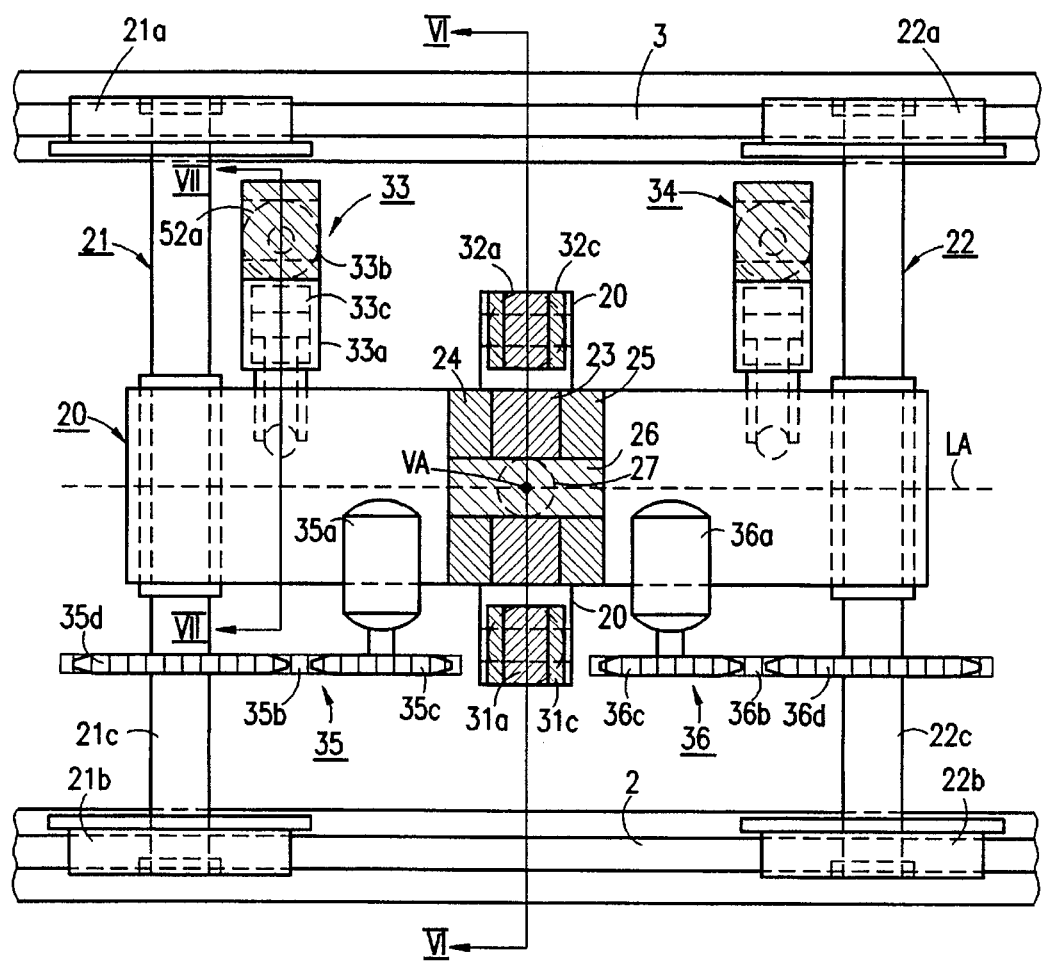
FIG. 5 is a sectional view along line V—V of FIG. 4.
Figure 6:
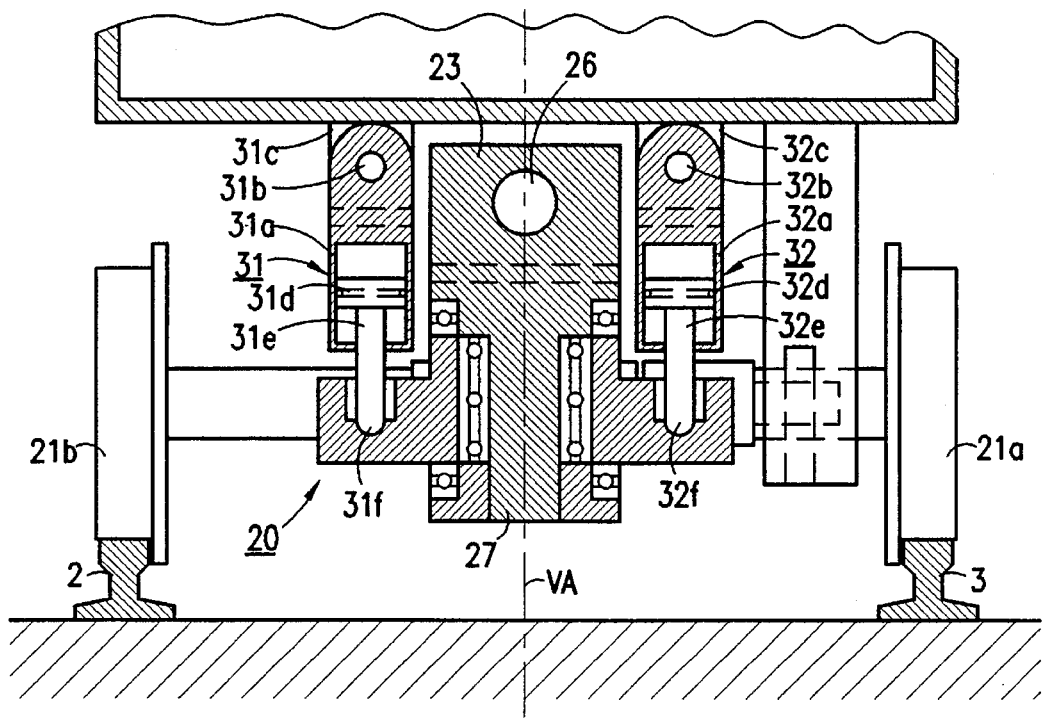
FIG. 6 is a sectional view along line VI—VI of FIG. 5.
Figure 7:
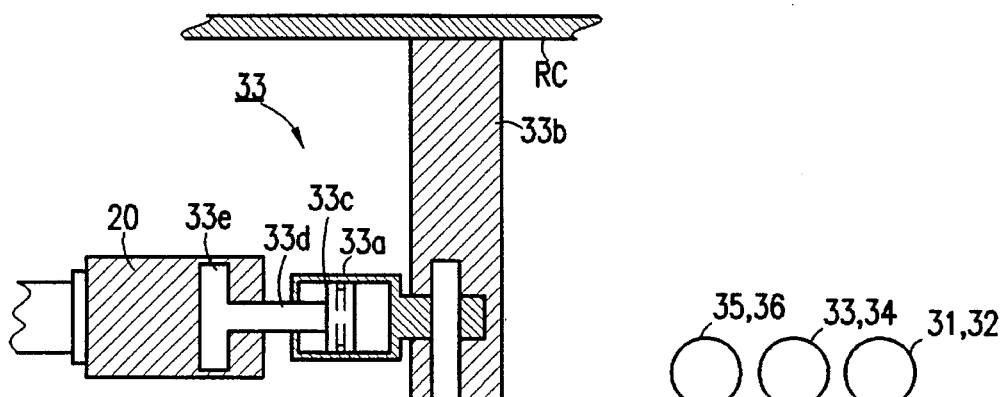
FIG. 7 is a view along VII—VII of FIG. 5.

Two further drive units, shown at 33 and 34 in FIG. 5, are provided for pivoting the undercarriage 20 about the vertical pin 27. This is more particularly shown in FIG. 7, wherein it will be seen that drive unit 33 includes a cylinder 33a pivotally mounted to a post 33b depending from the bottom wall of the railroad car RC, and a piston 33c having a rod 33d pivotally mounted by pin 33e to the undercarriage 20 at one side of the vertical pivot pin 27. The other drive unit 34 is similarly constructed and coupled to the undercarriage 20 at the opposite side of the vertical pivot pin 27. Thus, when the piston 33c in drive unit 33 is extended, and the corresponding piston in drive unit 34 is contracted, the undercarriage 20 will be pivoted about the vertical pivot pin 27 coaxial with the vertical axis VA in the counter-clockwise direction as shown in FIG. 5.

FIGS. 4–7 illustrate two further drive units, generally designated 35 and 36, used as traction drives for rotating the axle 21c, 22c, of the two wheel assemblies 21, 22 carried by the undercarriage unit 20, for driving the railroad car. Thus, drive unit 35 includes a motor 35a mounted on the undercarriage 20 at one side of vertical pin 27 and coupled to the axle 21c of the respective wheel assembly 21 by a sprocket chain 35b engageable with a sprocket wheel 35c coupled to the motor, and a sprocket wheel 35d coupled to the axle 21c of the front wheel assembly 21. Drive unit 36 includes a similar motor 36a carried by the undercarriage 20 at the opposite side of vertical pin 27 driving a chain 36b engaging a sprocket wheel 36c coupled to the motor, and another sprocket wheel 36d coupled to axle 22c of the rear wheel assembly 22.

It will thus be seen that drive units 31, 32 may be controlled to pivot the railroad car RC with respect to the undercarriage 20 about the horizontal longitudinal axis LA coaxial with swivel pin 26; that drive units 33, 34 may be controlled to pivot the railroad car with respect to the undercarriage 20 about the central vertical axis VA coaxial with pin 27; and/or that drive units 35 and 36 may be controlled to rotate the wheels 21a, 21b and 22a, 22b of the two wheel assemblies 21, 22 to drive the railroad car along the tracks.

Figure 8:
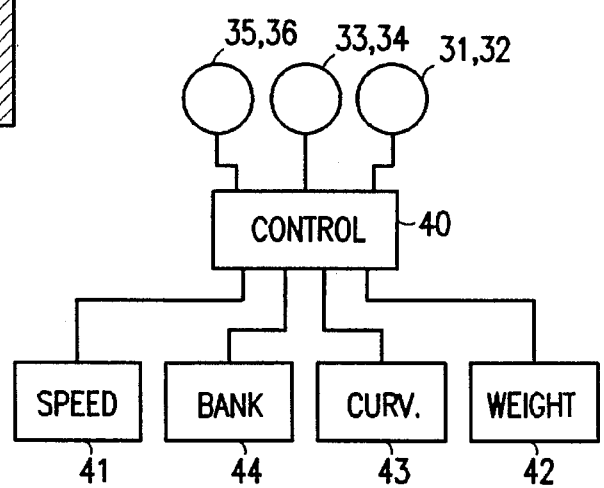
FIG. 8 schematically illustrates the electrical control of the vehicle of FIGS. 4–7.

FIG. 8 schematically illustrates the electrical control of the various drives in the vehicle of FIGS. 4–7. Thus, a control circuit 40 includes inputs from a speed sensor 41, a weight sensor 42, a track-curvature sensor 43, and and/or a track-banking sensor 44. The speed and weight sensors 41, 42 may be conventional sensors; the track-curvature sensor may be a centrifugal-force-responsive device; and the track-banking sensor 44 may be an inclination-responsive device. Some or all of these sensors may be used for controlling: (a) drive units 31, 32 for pivoting the railroad car RC about the longitudinal axis LA via swivel pin 26; (b) drive units 33, 34 for pivoting the railroad car about the vertical axis via vertical pin 27; and/or (c) drive units 35, 36 for rotating the wheels to drive them along the tracks.

As indicated earlier, pivoting the railroad car RC about the longitudinal axis LA when the railroad car traverses a curve will apply a horizontal force to the tracks 11, 12, as shown by arrow HF in FIG. 2. FIGS. 9–12 illustrate several constructions of wheels that may be used for better resisting these horizontal forces.

Figure 9:
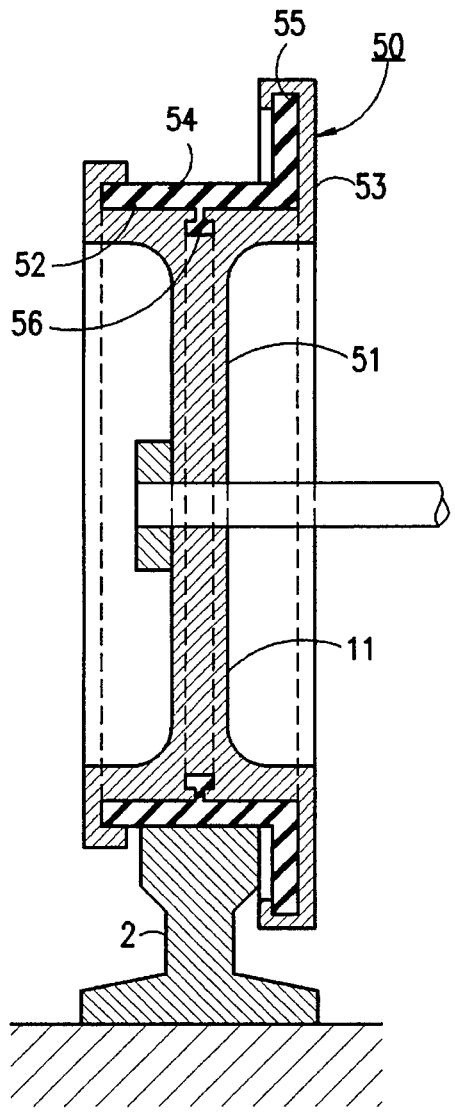
FIGS. 9, 10, 11 and 12 are sectional views illustrating various constructions of wheels for use in the vehicle of FIGS. 4–7.

The wheel illustrated in FIG. 9, and therein designated 50, includes a metal rim 51 having an outer surface 52 formed with a peripheral flange 53 on one side of the wheel extending radially outwardly of the wheel for engaging the side of the respective track. The outer surface 52 of the metal rim 51 is lined with a solid rubber liner 54 which includes a radial section 55 lining the peripheral flange 53. Rubber liner 54 is integrally formed with the radial section 55 on its outer surface, and with a rib 56 on its inner surface received within an annular groove formed on the outer surface of the metal rim 51, for securing the liner to the metal rim. Preferably, an adhesive is also used for this purpose.

In FIG. 9, the peripheral flange 53 and the radial section 55 of the rubber liner 54 are located on the right side of the metal rim 51, to engage the inner side of the respective track, as shown by wheel 11 and track 2 in FIG. 2. It will be appreciated that, in the other wheel of the respective pair (e.g., wheel 12 in FIG. 2), the peripheral flange 53 and the radial section 55 of the rubber liner 54 would be on the opposite side of the wheel, so as to engage the inner side of the other track in the pair, as shown by wheel 12, engaging the inner side of track 3 in FIG. 2.

Figure 10:
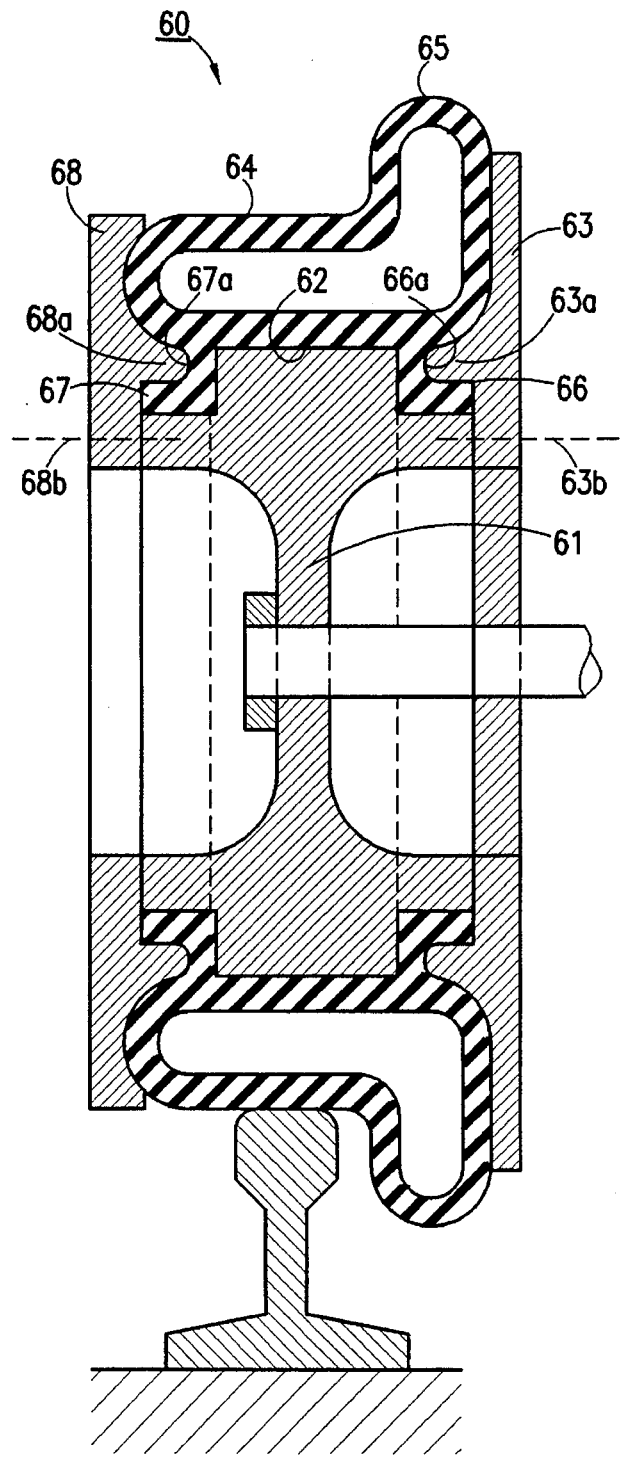

FIG. 10 illustrates another wheel construction, generally designated 60, also including a metal rim 61 having an outer surface 62, and a peripheral flange 63 extending radially outwardly of surface 62. In this case, flange 63 is constituted of the outer section of a disc.

In the wheel 60 illustrated in FIG. 10, the outer surface 62 and the peripheral flange 63 are both lined by an inflatable rubber member 64 which includes a radial section 65 covering the inner face of flange 63.

For securing the inflatable rubber liner 64 to the metal rim 61, the liner is provided with a pair of extensions 66, 67 on its opposite sides each formed with an annular groove 66a, 67a. Side disc 63 is formed with an annular rib 63a received within groove 66a, and is secured to the respective side of the metal rim 61 by bolts 63b. A similar disc 68 on the opposite side of metal rim 61, but of smaller outer diameter than disc 63, is formed with a similar annular rib 68a received within annular groove 67a of the inflated rubber member 64, and is secured to the respective side of the wheel by bolts 68b.

It will be appreciated that the other wheel of the pair will be similarly constructed, but with the flange 63 and the radial section 65 on the opposite side of the wheel, as described above with respect to FIGS. 2 and 9.

Figure 11:
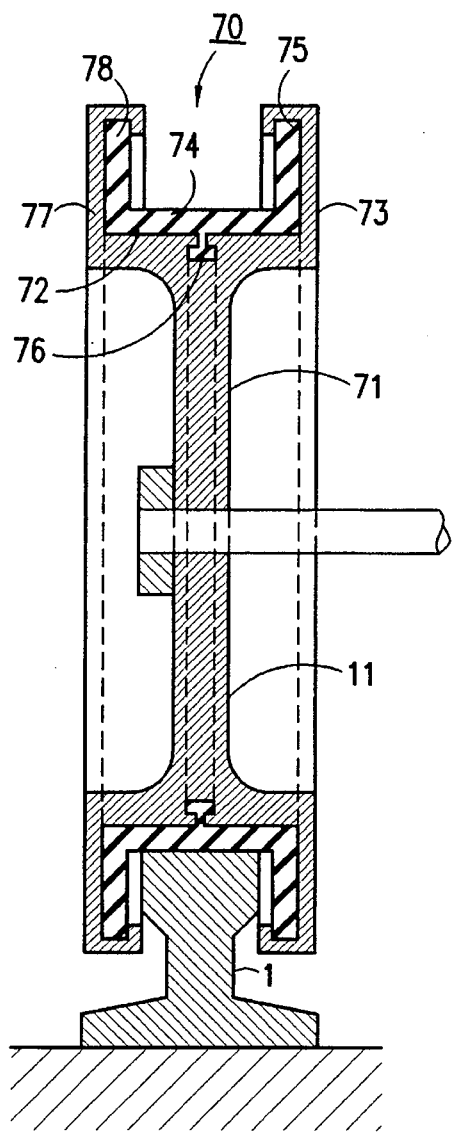

FIG. 11 illustrates another wheel construction, similar to that of FIG. 9, but including a flange and a radial extension of the liner on both sides of the wheel. Thus, the wheel illustrated in FIG. 11, therein generally designated 70, also includes a metal rim 71 having an outer surface 72, a peripheral flange 73 extending radially outwardly of the wheel, and a solid-rubber liner 74 including a radial section 75 lining the outer surface 72 of the rim, and the inner surface of the flange 73, and secured to the outer surface of the rim by a rib 76. In this case, however, the metal rim 71 is formed with a second peripheral flange 77 on its opposite side; and the solid rubber liner 74 is formed with a second radial section 78 engageable with the inner surface of flange 77. Thus, in the wheel of FIG. 11, the outer surface of the metal rim 71 lined with the solid-rubber liner 74 will be engageable with both sides of the respective rail.

Figure 12:
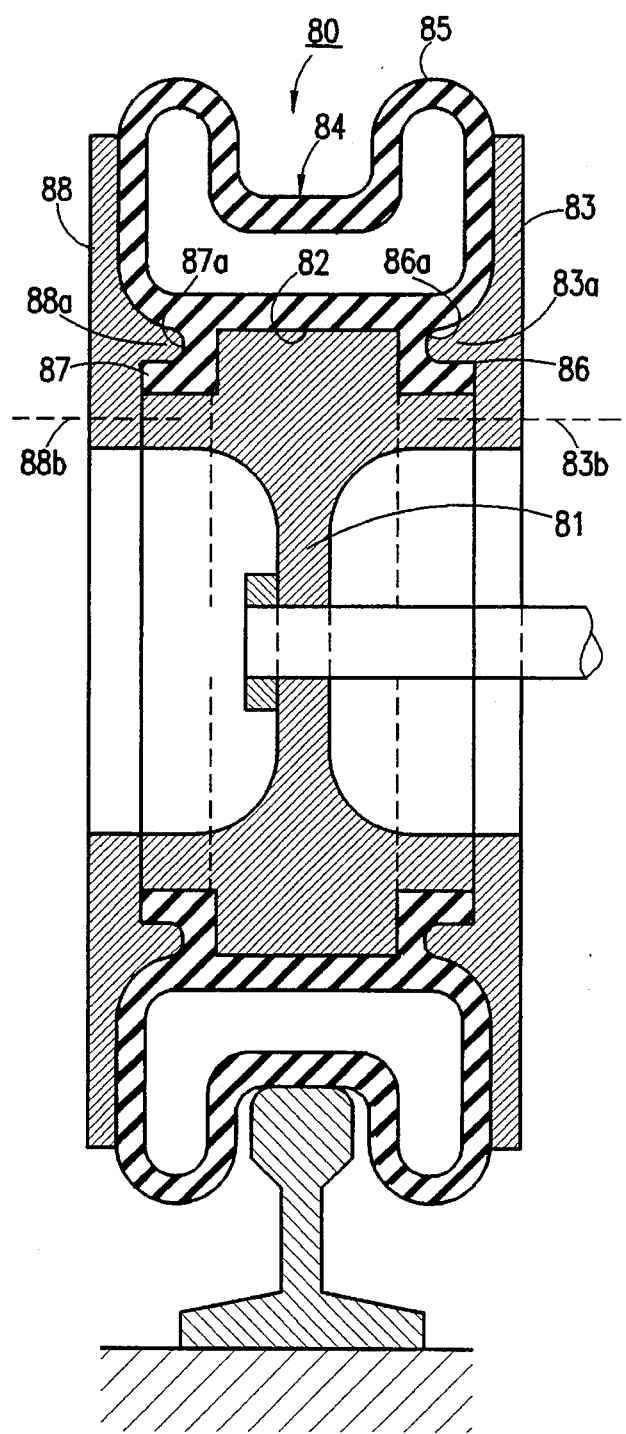

FIG. 12 illustrates a wheel construction, generally designated 80, similar to that of FIG. 10, but in which the inflatable rubber liner is engageable also with the two opposite side of the rail. Thus, the wheel illustrated in FIG. 12, therein generally designated 80, also includes: a metal rim 81 formed with an outer surface 82; a disc 83 secured to one side of the metal rim 81; an inflatable rubber liner 84 including a radial section 85 lining the outer surface 82 of the metal rim 81 and also the inner surface of flange 83; and a pair of extensions 86 and 87 for securing the inflatable rubber liner 84 to the wheel by means of an annular rib 83a in disc 83 received within an annular groove 86a formed in extension 86, and an annular rib 88a in disc 88 received within a groove 87a formed in extension 87. As in the construction illustrated in FIG. 10, both discs 83 and 88 are secured to the metal rim 81 by bolts 83b, 88b, respectively.

In the construction illustrated in FIG. 12, the disc 68 is also formed with an extension to define a peripheral flange, corresponding to flange 83, at the opposite side of the wheel; and the rubber inflatable member 84 is formed with a second radial section 89, on the side opposite to that of radial section 85, so that both radial sections of the inflatable rubber liner will straddle and be engageable with the opposite sides of the respective rail.

While the invention has been described with respect to several preferred embodiments, it will be appreciated that these are set forth merely for purposes of example, and that many other variations, modifications and applications of the invention may be made.

I claim:

1. A vehicle movable along a pair of tracks, comprising:

a vehicle body having a front end, a rear end, and a longitudinal axis extending lengthwise of the vehicle body;

a front wheel assembly including a pair of front track-engaging wheels mounted on opposite sides of said longitudinal axis;

a rear wheel assembly including a pair of rear track-engaging wheels mounted on opposite sides of said longitudinal axis;

an undercarriage unit carrying said front wheel assembly and said rear wheel assembly;

a horizontal pin pivotally mounting said undercarriage to said vehicle body about a horizontal pivot axis coaxial with said longitudinal axis;

a vertical pin pivotally mounting said undercarriage to said vehicle body about a vertical axis perpendicular to said longitudinal axis;

a first drive for pivoting said vehicle body with respect to said undercarriage about said horizontal pin;

and a second drive for pivoting said vehicle body with respect to said undercarriage and said front and rear wheel assemblies about said vertical pin;

the wheels of each wheel assembly being of metal and including a track-engaging surface formed with a peripheral flange on one side of one wheel of the pair, and on the opposite side of the other wheel of the pair, which flanges extend radially outwardly of the wheels for engaging the respective sides of the tracks;

the outer surface of each wheel, including its peripheral flange, being covered by a resilient member engageable with the respective track.

2. The vehicle according to claim 1, further including a control system for controlling said first drive.

3. The vehicle according to claim 2, wherein said control system includes means for controlling said first drive in response to the speed of the vehicle.

4. The vehicle according to claim 3, wherein said control system includes means for controlling said first drive in response to the weight of the vehicle.

5. The vehicle according to claim 3, wherein said control system includes means for controlling said first drive in response to the curvature of the tracks on which said vehicle travels.

6. The vehicle according to claim 3, wherein said control system includes means for controlling said first drive in response to the banking of the tracks on which said vehicle travels.

7. The vehicle according to claim 1, wherein said resilient member is an inflated rubber member.

8. The vehicle according to claim 1, wherein said track-engaging surface of each wheel includes two peripheral flanges on the opposite side of the respective wheel extending radially outwardly of the wheel for engaging the opposite sides of the respective track.

9. The vehicle according to claim 1, wherein said first drive includes a pair of piston-cylinder assemblies coupled between the vehicle body and each wheel assembly on opposite sides of said longitudinal axis.

10. The vehicle according to claim 1, wherein said second drive includes a piston-cylinder assembly coupled between one side of the undercarriage and the respective side of the vehicle body.

\* \* \* \* \*